(12) United States Patent
Rosello et al.

(10) Patent No.: US 11,470,224 B2
(45) Date of Patent: Oct. 11, 2022

(54) COMPENSATING OVER-SATURATION DUE TO DYE-ENRICHED COLORANT

(71) Applicant: Hewlett-Packard Development Company, L.P., Spring, TX (US)

(72) Inventors: Maxime Rosello, Labege (FR); Li Qian, Sant Cugat del Valles (ES); Jaime Juan Munoz, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/419,085

(22) PCT Filed: Feb. 21, 2019

(86) PCT No.: PCT/US2019/018950
§ 371 (c)(1),
(2) Date: Jun. 28, 2021

(87) PCT Pub. No.: WO2020/171817
PCT Pub. Date: Aug. 27, 2020

(65) Prior Publication Data
US 2022/0078310 A1    Mar. 10, 2022

(51) Int. Cl.
*H04N 1/60* (2006.01)
*B41J 2/045* (2006.01)
*H04N 1/00* (2006.01)

(52) U.S. Cl.
CPC ........ *H04N 1/6027* (2013.01); *B41J 2/04508* (2013.01); *H04N 1/00005* (2013.01)

(58) Field of Classification Search
None
See application file for complete search history.

(56) References Cited

U.S. PATENT DOCUMENTS

| | | |
|---|---|---|
| 6,084,689 A | 7/2000 | Mo |
| 6,154,227 A | 11/2000 | Lund |
| 6,585,364 B2 | 7/2003 | Kasperchik et al. |
| 6,619,784 B2 | 9/2003 | Bauer |
| 6,690,485 B1 | 2/2004 | Borrell et al. |
| 7,190,485 B2 | 3/2007 | Couwenhoven et al. |
| 7,403,307 B2 | 7/2008 | Huang et al. |
| 8,743,396 B2 | 6/2014 | Bastani et al. |
| 8,955,940 B1 | 2/2015 | Smith et al. |
| 2011/0069101 A1 | 3/2011 | Buschmann |
| 2015/0002909 A1 | 1/2015 | Masuda et al. |
| 2015/0360491 A1 | 12/2015 | Billow et al. |

FOREIGN PATENT DOCUMENTS

| | | |
|---|---|---|
| EP | 0864424 B1 | 3/2005 |
| EP | 1297960 B1 | 8/2008 |
| EP | 1029687 B1 | 2/2012 |

*Primary Examiner* — Lennin R RodriguezGonzalez
(74) *Attorney, Agent, or Firm* — HP Inc. Patent Department

(57) ABSTRACT

A method is described in which image data of an image to be printed is obtained wherein the image data includes data of each colorant to be printed. The image data of each colorant to be printed is analysed to detect areas of the image in which dye-enriched colorant will occur during printing. The image data is modified to compensate for over-saturation due to the dye-enriched colorant in the detected areas and the image is printed based on the modified image data.

15 Claims, 5 Drawing Sheets

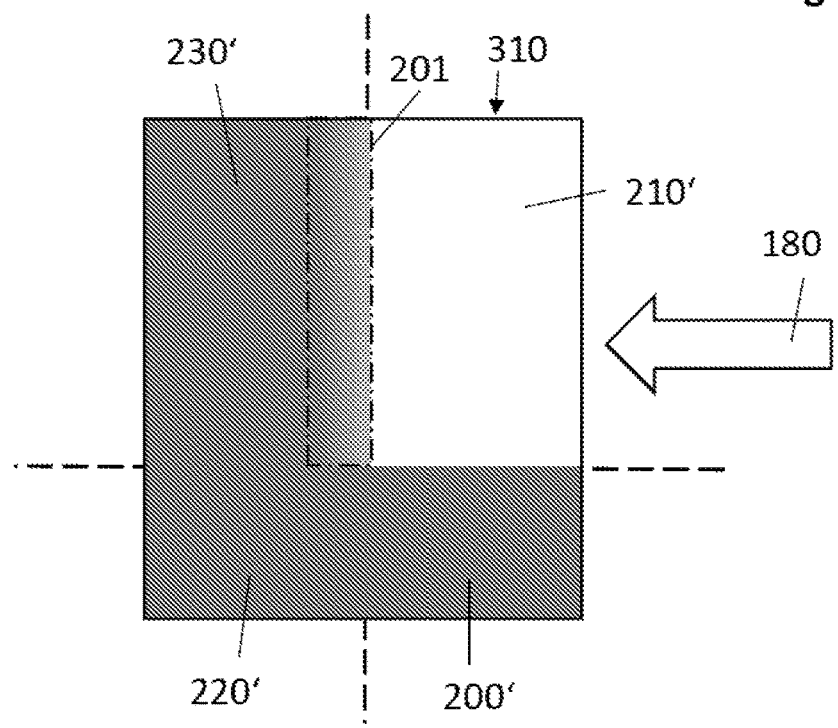
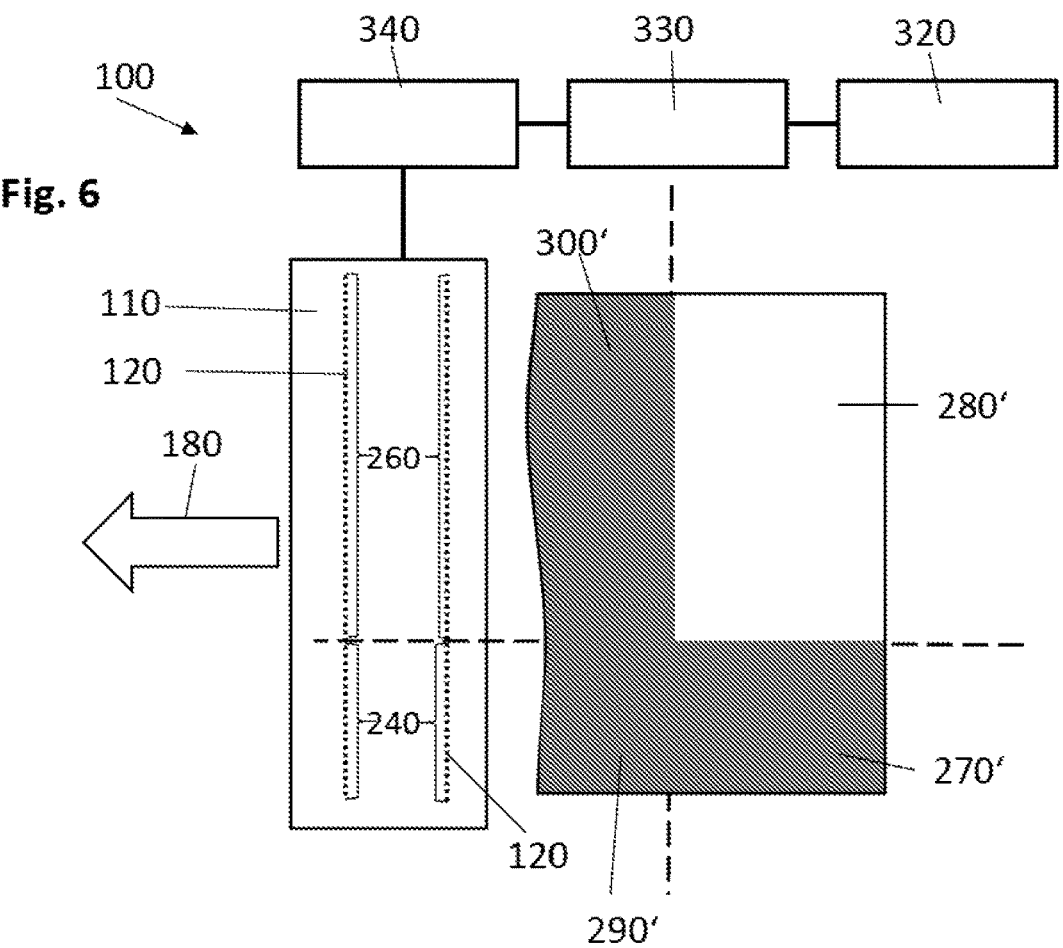

COMPENSATING OVER-SATURATION DUE TO DYE-ENRICHED COLORANT

BACKGROUND

Print apparatus utilise various techniques to disperse print agents such as colorant, for example comprising a dye or toner, coating agents, thermal absorbing agents and the like. Such apparatus may comprise a printhead. An example printhead includes a set of nozzles and a mechanism for ejecting a selected agent as a fluid, for example a liquid, through a nozzle. In such examples, if a nozzle remains idle for some time, changes to the composition of the print agent may occur, for example the concentration of a dye in a colorant may increase.

BRIEF DESCRIPTION OF DRAWINGS

Non-limiting examples will now be described with reference to the accompanying drawings, in which:

FIG. 5 is an example modified image of the image of FIG. 3;

FIG. 6 is an example of a thermal inkjet printer printing the image of FIG. 3 based on modified image data corresponding to the modified image of FIG. 5;

DETAILED DESCRIPTION

Figure 1:
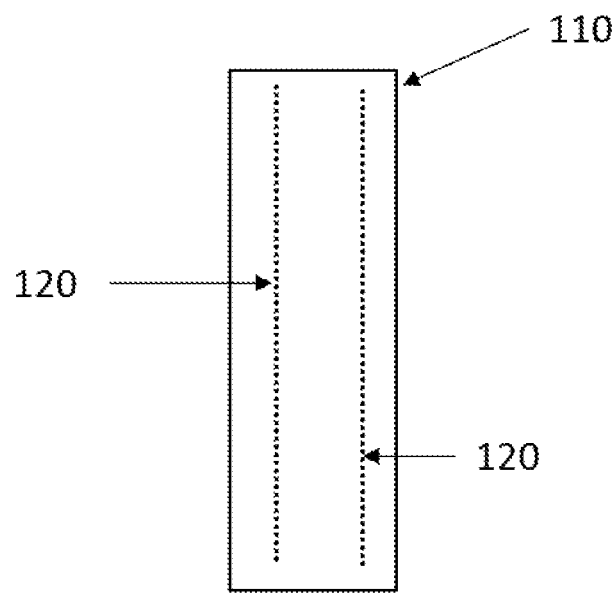
FIG. 1 is a simplified schematic of an example of a printhead of a thermal inkjet printer.

FIG. 1 shows a simplified schematic of an example of a printhead 110, which may, for example, be for two-dimensional printing (for example for applying drops of a colorant such as ink on to a substrate such as paper, card, plastic, metal, fabric or the like) or three-dimensional printing (for example, applying drops of print agents which cause selective fusing or coloring of a build material, for example a powdered build material such as a plastic powder). In some examples the printhead 110 may be an inkjet printhead, such as a thermal inkjet printhead.

In the example shown in FIG. 1, the printhead 110 comprises two rows of nozzles 120. Each nozzle in this example can independently generate drops of colorant and apply them to the substrate. Each row of nozzles 120 may be used with different colorant for example in order to print different colors.

Figure 2:
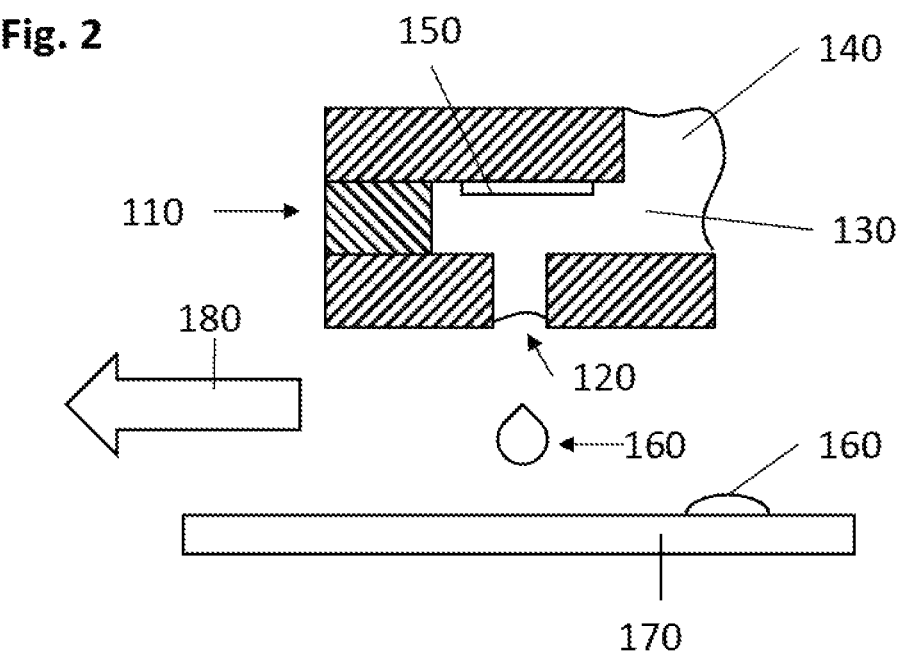
FIG. 2 is a simplified schematic of an example of nozzle of a thermal inkjet printer.

FIG. 2 shows an example of a nozzle 120 of a thermal inkjet printhead 110. Each nozzle 120 is connected to a chamber 130 which in turn is connected to a colorant supply 140 from which colorant can flow into the chamber 130 and the nozzle 120. The colorant forms a meniscus in the nozzle 120 when the nozzle is idle.

A heating element is used as an activating mechanism 150 which is arranged in the chamber 130 of the example shown in FIG. 2. The heating element of the activating mechanism 150 is able to heat the colorant in the chamber 130 so that a colorant vapour bubble forms in the chamber 130 which pushes an amount of colorant through the nozzle 120 which forms at least one drop 160 which is applied to the substrate 170 situated under the printhead 110 in the example shown in FIG. 2. Other examples may use different activating mechanisms. As an example, drops may be ejected from the nozzle 120 by a piezo mechanism as an activating mechanism 150.

During printing, the printhead 110 may move relative to the substrate 170 in a printing direction 180. In this manner, a pattern of drops 160 of colorant may be applied to the substrate. In the example shown in FIGS. 1 and 2, the printing direction 180 is perpendicular to the arrangement of each row of nozzles 120. As a result, each nozzle is associated with a particular area of the substrate 170 over which the nozzle 120 is moved in the printing direction 180. Correspondingly, each nozzle is associated with a particular image region of a printed image.

The heating element or an additional heating element of the activating mechanism 150 may also be provided to heat the colorant to a trickle warming temperature which ensures a sufficient viscosity of the colorant for unrestricted flow of the colorant from the colorant supply 140 into the chamber 130 and the nozzle 120. The trickle warming temperature may depend on the type of colorant used, the structure of the printhead 110, the ambient temperature or a combination thereof.

When the nozzle 120 is idle and no drops 160 of colorant are applied to the substrate 170, the colorant is in contact with the atmosphere through the meniscus of the nozzle 120. Evaporation of a solvent (for example, water) of the colorant can lead to dye-enrichment of the colorant when the concentration of the dye increases when the nozzle 120 has been idle for too long.

Figure 3:
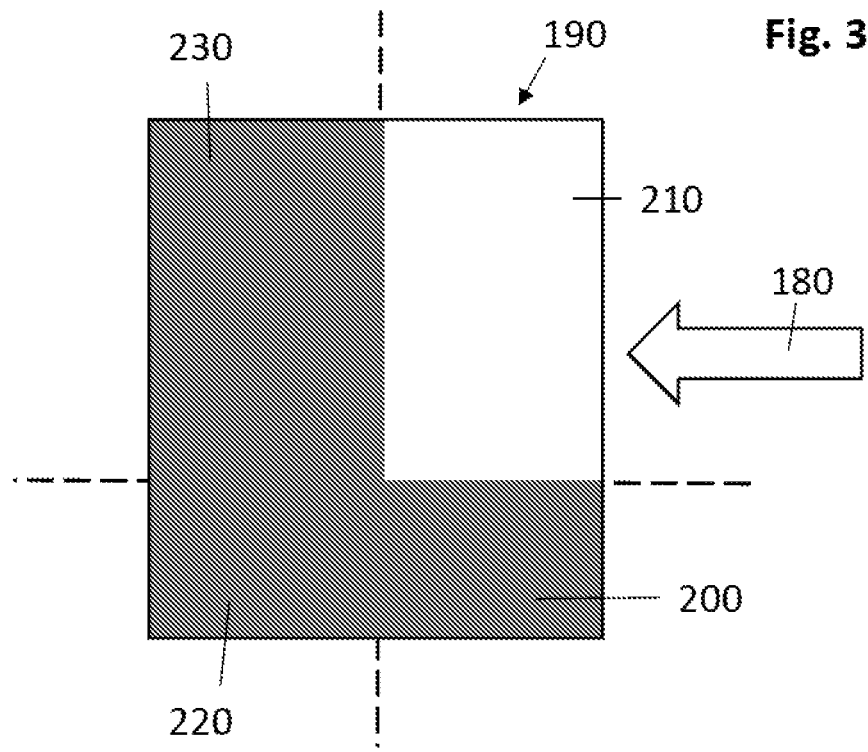
FIG. 3 is an example of an image to be printed.

FIG. 3 shows an example of an image 190 to be printed. In this example, the printing direction 180 in which the printhead 110 moves relative to the substrate 170 on which the image 190 is printed is indicated by an arrow. The example image can be divided into four image regions 200, 210, 220 and 230. In three of these image regions 200, 220 and 230, colorant is to be printed onto the substrate during printing whereas in the image region 210, no colorant is to be printed onto the substrate.

Figure 4:
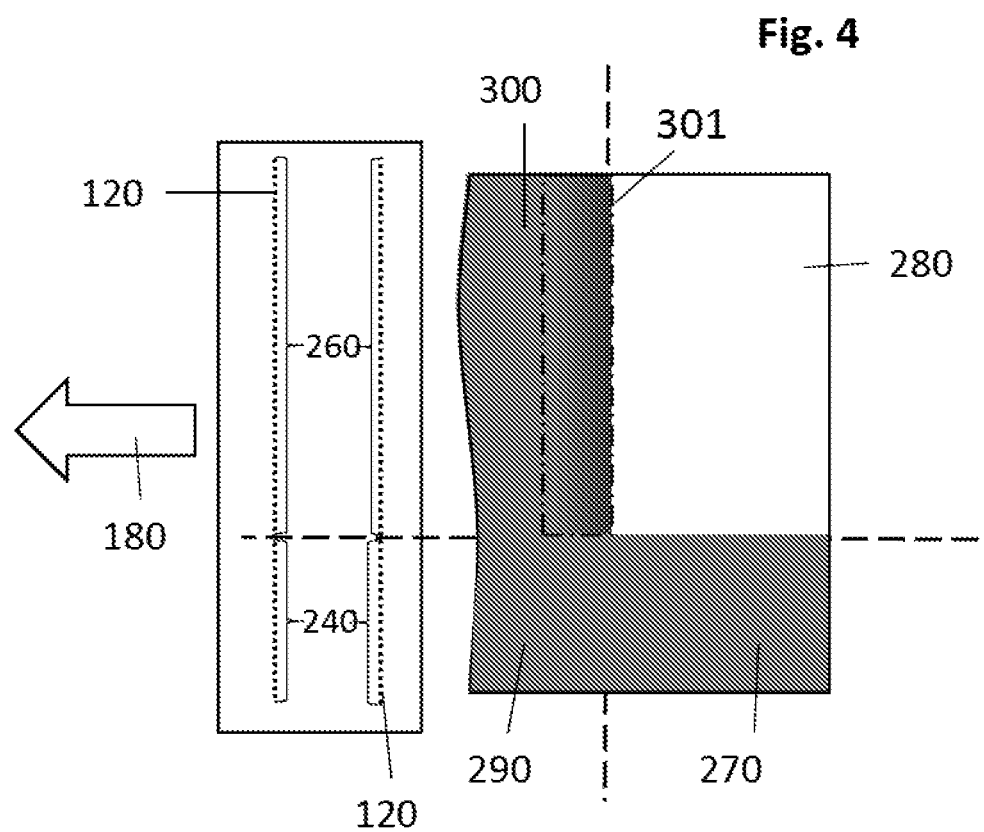
FIG. 4 is an example of a printed image of the image of FIG. 3 based on unmodified image data containing image quality defects associated with dye-enrichment.

FIG. 4 shows an example of a printed image on the substrate 170 based on the image data of the image 190 of FIG. 3. The printhead 110 used for printing the image on the substrate 170 is shown next to the image along with its printing direction 180. The position of the printhead 110 and the printing direction 180 determine which nozzles 120 are associated with which image region of the image to be printed and corresponding area of the printed image on the substrate 170. When printing, the image regions 200 and 220 are associated with a first set 240 of nozzles 120 which are associated with corresponding areas 270 and 290 of the printed image on the substrate 170. The image regions 210 and 230 on the other hand are associated with a second set 260 of nozzles 120 and corresponding areas 280 and 300 of the printed image on the substrate 170.

During printing of the first half of the image with the image regions 200 and 210 the second set 260 of nozzles 120, corresponding to the image region 210, remain idle as no colorant is to be printed in the area 280 of the image on the substrate 170 and dye-enrichment may occur in the colorant in these nozzles 120 and corresponding chambers 130. During printing of the second half of the image with the image regions 220 and 230, colorant is to be applied to both areas 290 and 300 of the image on the substrate 170. As the second set 260 of nozzles 120 in the example of FIG. 4 contains dye-enriched colorant with a higher concentration of dye, the area 300 in which the dye-enriched colorant occurs during printing may contain a visible over-saturation quality defect. As the nozzles 120 of the second set 260 of nozzles 120 generate drops 160 of colorant that are applied to the substrate 170 in the area 300 of the image, the dye-enriched colorant is used up and non-dye-enriched colorant flows into the chamber 130 and nozzle 120 from the colorant supply 140, gradually reducing the over-concentration of dye in the colorant and therefore gradually reducing the over-saturation quality defect 301 in the printed image which is shown in FIG. 4 by a broken line rectangle.

FIGS. 5 and 6 show an example of a thermal inkjet printer 100 and a modified image 310 which is modified to compensate for over-saturation due to the dye-enriched colorant.

The thermal inkjet printer 100 of the example shown in FIG. 6 has an image analysing module 320 to analyse image data of an image to be printed, in the present example the image data of the image 190 of FIG. 3. The image data includes data of each colorant to be printed, corresponding to a color model of the thermal inkjet printer 100. The image data may be received by the image analysing module 320 directly or the image analysing module 320 may receive image data in other form, such as a text file, image files with different color models, or any other data format that enables storage of data relating to images to be printed. Such image data in other form may be converted into image data including data of each colorant to be printed in the color model of the thermal inkjet printer 100.

The image analysing module 320 is to identify nozzles 120 in which dye-enrichment is predicted to occur during printing of the image 190 to be printed. As no colorant is to be applied to the image region 210, the image analysing module 320 may predict that dye-enrichment will occur in the nozzles 120 of the second set 260 of nozzles 120 which correspond to that image region as they will be idle during the printing of the image region 210.

The thermal inkjet printer 100 of the example shown in FIG. 6 further includes an image modifying module 330 to modify the image data in order to compensate dye-enrichment in the nozzles 120 identified by the image analysing module 320, in which dye-enrichment is predicted to occur during printing. An example of such modified image data is illustrated by FIG. 5 which shows a corresponding modified image 310. The modified image 310 of FIG. 5 can be divided in to image regions 200', 210', 220' and 230' corresponding to the image regions 200, 210, 220 and 230 of the unmodified image 190 of FIG. 3. Based on the prediction that dye-enrichment will occur in the nozzles 120 of the second set 260 of nozzles 120 during printing, the image region 230' corresponding to an area of the image to be printed on the substrate 170 in which the dye-enriched colorant of the nozzles 120 of the second set 260 of nozzles 120 will be applied to the substrate 170 is modified by decreasing the saturation in the modified image data to compensate for the higher concentration of dye in the dye-enriched colorant. In the example of FIG. 5, the location of the decreased saturation is shown in FIG. 4 by a broken line rectangle 201.

The modified image data includes data of each colorant to be printed, corresponding to a color model of the thermal inkjet printer 100. The modified image data may also be converted to any other data format that enables storage of data relating to images to be printed, for example to image files with different color models.

The image analysing module 320 may base the identification of the nozzles 120 in which dye-enrichment is predicted to occur during the printing on the determination of an idle time of each nozzle 120 of the printhead 110, the type of colorant, or the contone values of the different image regions 200, 210, 220, and 230 or corresponding areas. The identification may also be based on any combination of these determined parameters.

The idle time of each nozzle may for example be determined based on the image points or pixels along a line in the printing direction 180 for each colorant of the printhead 110 in which at least one colorant is not to be applied to the substrate in connection with the printing speed in which the printhead 110 is moved relative to the substrate 170. Further additional idle times in which the printhead is not printing may be considered. The longer the idle time, the higher the degree of dye-enrichment becomes as the concentration of dye in the colorant increases with time, e.g. due to evaporation of solvent in the colorant. The volume of the dye-enriched colorant in the nozzle 120 and the chamber 130 may also increase with the idle time, e.g. due to diffusion of dye and solvent.

The type of colorant may for example be determined from information of the colorant supply, for example an ink cartridge, or may be information set by a user. The composition of different types of colorant may be different, which may result in different rates of solvent evaporation. Further, different colorants may have different relation between dye-concentration and over-saturation image quality defects.

The contone values of the different image regions 200, 210, 220, and 230 or corresponding areas may for example influence the degree of over-saturation quality defects and may influence the size of the image region associated with the predicted over-saturation quality defect, as for example darker image points or pixels will cause the printhead 110 to apply a higher volume of colorant in the corresponding spot on the substrate 170 so that the amount or volume of dye-enriched colorant in the nozzle 120 and chamber 130 will be applied to a smaller area of the substrate 170 until it is replaced in the nozzle 120 and chamber 130 by non-dye-enriched colorant from the colorant supply 140.

The image analysing module 320 may for example further base the identification of the nozzles 120 in which dye-enrichment is predicted to occur during the printing on the determination of at least one of the following parameters: masking, resolution, print speed, number of passes, firing frequency of each nozzle, temperature and humidity in a print chamber, and a trickle warming temperature. The identification may also be based on any combination of the above determined parameters.

Masking and resolution may for example influence the distribution of drops 160 of colorant applied to a particular area of the image on the substrate 170 and may influence the size of the image region associated with the predicted over-saturation quality defect.

Print speed may for example influence the idle time for nozzles 120 associated with image regions in which no colorant is to be applied by these nozzles 120.

The number of passes of the printhead 110 over the same area of the area of the image on the substrate 170 during printing may for example influence the amount of colorant applied to that area of the image on the substrate 170 as the total amount of applied colorant is divided for example by the number of passes of the printhead 110 as the printhead 110 may apply a partial amount of colorant during each pass. In such an example, the number of passes may influence the size of the image region associated with the predicted over-saturation quality defect.

The firing frequency of each nozzle may for example influence the amount or volume of colorant applied to the substrate 170 and may influence the size of the image region associated with the predicted over-saturation quality defect.

The temperature and humidity in a print chamber in which the thermal inkjet printer 100 or at least the printhead 110 is arranged may for example influence the rate of evaporation of the solvent of the colorant and may influence the rate of dye-enrichment of the colorant in the nozzle 120 and chamber 130.

The trickle warming temperature of a particular nozzle 120 and associated chamber 130 may for example influence the rate of evaporation of the solvent of the colorant and may influence the rate of dye-enrichment of the colorant in the respective nozzle 120 and chamber 130.

The image analysing module 320 may calculate a dye-enrichment concentration of each nozzle. The calculation of the dye-enrichment concentration may for example be based on at least one of the parameters idle time of each nozzle 120 of the printhead 110, the type of colorant, print speed, temperature and humidity in a print chamber, and the trickle warming temperature.

The calculated dye-enrichment concentration of each nozzle may for example be used by the image modifying module 330 to modify the image data to compensate dye-enrichment in the identified nozzles 120 in which dye-enrichment is predicted to occur based on the calculated dye-enrichment concentration of each nozzle. A higher dye-enrichment concentration may lead to more intense over-saturation quality defects which may need stronger compensation, for example by decreasing the saturation in the image regions of the modified image data corresponding to the areas of the image in which the dye-enriched colorant will occur during printing.

The image analysing module 320 may calculate a number of pixels in which dye-enriched colorant will be printed. The calculation of the number of pixels in which dye-enriched colorant will be printed may depend on an amount or volume of dye-enriched colorant in each nozzle 120 and associated chamber 130 and on the amount or volume of dye-enriched colorant applied to an area of the image on the substrate 170 corresponding to a particular pixel of the image to be printed. For example, the calculation may be based on the parameters of the type of colorant, the contone values of the different image areas or regions, masking, resolution, number of passes, and the firing frequency of each nozzle.

As an example, the number of pixels, in which dye-enriched colorant will be printed may be calculated using the following formula:

$$n_{pix} = n_{passes} \frac{dr_{pass}}{dr_{pix}} \frac{res}{600}, \quad (1)$$

wherein $n_{pix}$ is the number of pixels, in which dye-enriched colorant will be printed, $n_{passes}$ is the number of passes of the printhead 110 over the corresponding area of the substrate and may for example be determined empirically for different print modes, $dr_{pass}$ is the number of drops 160 to be generated by the nozzle 120 needed to recover dye-enrichment for a given number of passes and a given colorant, $dr_{pix}$ is the number of drops applied to the substrate 170 corresponding to each pixel and may for example be calculated based on a contone value of a linearization table a drop sequence of a selected mask, and res is the horizontal print resolution.

The image modifying module 330 may for example use the calculated number of pixels in which dye-enriched colorant will be printed to determine the image region in which the image data is modified to compensate for over-saturation. The image modifying module 330 and the image analysing module 320 may be cooperate iteratively as a modification of the image data for example by decreasing the saturation of a particular image region will change for example the associated contone value which may change the number of pixels in which dye-enriched colorant will be printed.

The thermal inkjet printer 100 of the example in FIG. 6 further includes a printer 340 for printing the image based on the modified image data. The printed modified image can be divided into areas 270', 280', 290' and 300' of the image on the substrate 170 corresponding to the areas 270, 280, 290 and 300 of FIG. 4. The decreased saturation in the image region 230' of the modified image 310 corresponding to the modified image data compensates the application of dye-enriched colorant by the nozzles 120 of the second set 260 of nozzles 120 on the substrate 170 which results in the area 300' of the image on the substrate 170 printed based on the modified image data not having an over-saturation quality defect.

Figure 7:
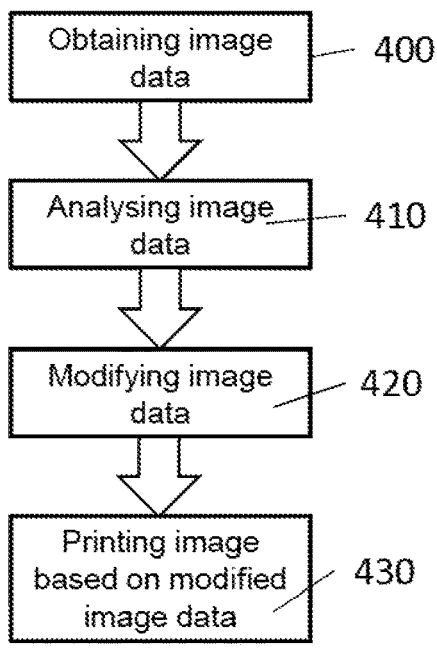
FIG. 7 is a flowchart of an example method of modifying image data to compensate over-saturation.
Figure 8:
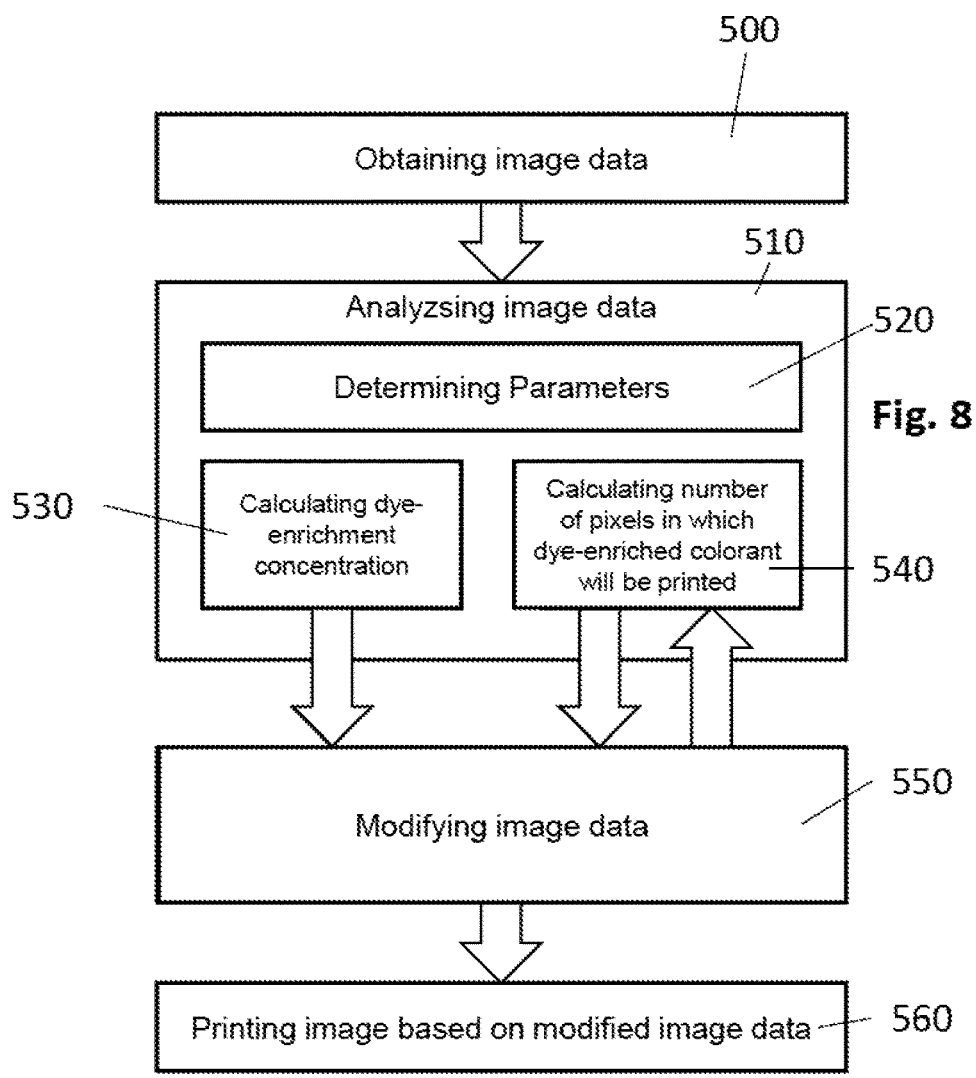
FIG. 8 is a flowchart of a second example method of modifying image data to compensate over-saturation.

FIGS. 7 and 8 are flowcharts of example methods of modifying image data to compensate over-saturation due to dye-enriched colorant. Examples in the present disclosure can be provided as methods, systems or machine-readable instructions, such as any combination of software, hardware, firmware or the like. Such machine-readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

According to the example method of FIG. 7, at block 400, image data of an image 190 to be printed may be obtained. The image data includes data of each colorant to be printed. Image data of the image to be printed may also be converted from different data formats such as a text file, image files with different color models or any other data format that enables storage of data relating to images to be printed to image data in the color model of the printer.

At block 410, the image data of each colorant to be printed may be analysed to detect areas of the image in which dye-enriched colorant will occur during printing. Dye-enrichment of the colorant may take place when a particular nozzle is idle for some time, for example because an area of the image on the substrate has not colorant applied. Dye-enriched colorant may therefore occur in areas of the image on the substrate which are arranged after such image areas that have no colorant applied.

At block 420, the image data may be modified to compensate for over-saturation due to the dye-enriched colorant in the detected areas. For example, over-saturation due to the dye-enriched colorant may be compensated by decreasing the saturation of the colorant in the modified image data corresponding to the detected areas. The modified image data may also be converted to a different data format, for example image files with different color models or any other data format that enables storage of data relating to images.

At block 430, the image may be printed based on the modified image data. In this manner, over-saturation quality defects can be avoided during printing while using the dye-enriched colorant for printing purposes. This allows an efficient use of colorant and reduces a need for discarding dye-enriched colorant. If the modified image data was converted to a different data format in block 420, for example to image files with different color models or any other data format that enables storage of data relating to images, the modified image data may be converted back to image data in the color model of the printer for the purpose of printing at block 430.

The second example method shown in FIG. 8 includes a block 500 relating to obtaining image data of an image 190 to be printed, a block 510 which relates to analysing the image data, a block 550 which relates to modifying the image data to generate modified image data and a block 560 which relates to printing the image based on the modified image data. The blocks 500 and 560 correspond to the blocks 400 and 430 of the first example method.

Block 510 includes a sub-block 520 in which at least one of the following parameters are determined: idle time of a nozzle of a printhead, the type of colorant, and the contone values of the different image areas, masking, resolution, print speed, number of passes, firing frequency of each nozzle, temperature and humidity in a print chamber, and a trickle warming temperature. Any combination of these parameters may be determined and used for the analysis of the image data of each colorant to detect areas of the image in which dye-enrichment will occur during printing.

The idle time of each nozzle may for example be determined based on the image points or pixels along a line in the printing direction 180 for each colorant of the printhead 110 in which at least one colorant is not to be applied to the substrate in connection with the printing speed in which the printhead 110 is moved relative to the substrate 170. Further additional idle times in which the printhead is not printing may be considered. The longer the idle time, the higher the degree of dye-enrichment becomes as the concentration of dye in the colorant increases with time, e.g. due to evaporation of solvent in the colorant. The volume of the dye-enriched colorant in the nozzle 120 and the chamber 130 may also increase with the idle time, e.g. due to diffusion of dye and solvent.

The type of colorant may for example be determined from information of the colorant supply, for example an ink cartridge, or may be information set by a user. The composition of different types of colorant may be different, which may result in different rates of solvent evaporation. Further, different colorants may have different relation between dye-concentration and over-saturation image quality defects.

The contone values of the different image regions 200, 210, 220, and 230 or corresponding areas may for example influence the degree of over-saturation quality defects and may influence the size of the area of the image in which dye-enriched colorant will occur during printing, as for example darker image points or pixels will cause the printhead 110 to apply a higher volume of colorant in a corresponding pixel area on the substrate 170 so that the amount or volume of dye-enriched colorant in the nozzle 120 and chamber 130 will be applied to a smaller area of the image of the substrate 170 until it is replaced in the nozzle 120 and chamber 130 by non-dye-enriched colorant from the colorant supply 140 when the nozzle 120 recovers from the dye-enrichment of the colorant.

Masking and resolution may for example influence the distribution of drops 160 of colorant applied to a particular area of the image on the substrate 170 and may influence the size of the area of the image in which dye-enriched colorant will occur during printing.

Print speed may for example influence the idle time for nozzles 120 associated with image areas in which no colorant will be applied by these nozzles 120.

The number of passes of the printhead 110 over the same area of the area of the image on the substrate 170 during printing may for example influence the amount of colorant applied to that area of the image on the substrate 170 as the total amount of applied colorant is divided for example by the number of passes of the printhead 110 as the printhead 110 may apply a partial amount of colorant during each pass. In such an example, the number of passes may influence the size of the area of the image in which dye-enriched colorant will occur during printing.

The firing frequency of each nozzle may for example influence the amount or volume of colorant applied to the substrate 170 and may influence the size of the image region associated with the predicted over-saturation quality defect.

The temperature and humidity in a print chamber, in which the thermal inkjet printer 100 or at least the printhead 110 thereof is arranged, may for example influence the rate of evaporation of the solvent of the colorant and may influence the rate of dye-enrichment of the colorant in the nozzle 120 and chamber 130.

The trickle warming temperature of a particular nozzle 120 and associated chamber 130 may for example influence the rate of evaporation of the solvent of the colorant and may influence the rate of dye-enrichment of the colorant in the respective nozzle 120 and chamber 130.

In sub-block 530, a dye-enrichment concentration of each nozzle of a printhead is calculated. The calculation of the dye-enrichment concentration may for example be based on at least one of the parameters idle time of each nozzle 120 of the printhead 110, the type of colorant, print speed, temperature and humidity in a print chamber, and the trickle warming temperature.

In sub-block 540, a number of pixels in which dye-enriched colorant will be printed is calculated. The calculation of the number of pixels in which dye-enriched colorant will be printed may depend on an amount or volume of dye-enriched colorant in each nozzle 120 and associated chamber 130 and on the amount or volume of dye-enriched colorant applied to an area of the image on the substrate 170 corresponding to a particular pixel of the image to be printed. For example, the calculation may be based on the parameters of the type of colorant, the contone values of the different image areas or regions, masking, resolution, number of passes, and the firing frequency of each nozzle. Further details on the calculation of the number of pixels in which dye-enriched colorant will be used, are disclosed in the section relating to the image analysing module 320 and formula (1).

In block 550, the image data may be modified to compensate for over-saturation due to the dye-enriched colorant in the detected areas. For example, over-saturation due to the dye-enriched colorant may be compensated based on the calculated dye-enrichment concentration of sub-block 530 by decreasing the saturation of the colorant in the modified image data corresponding to the detected areas based on the calculated number of pixels in which dye-enriched colorant will be printed determined in sub-block 540. A higher dye-enrichment concentration may lead to more intense over-saturation quality defects which may need stronger compensation, for example by decreasing the saturation in the image regions of the modified image data corresponding the areas of the image in which the dye-enriched colorant will occur during printing.

In block 550, the calculated number of pixels in which dye-enriched colorant will be printed may be used to determine the image data corresponding to the areas of the image in which dye-enriched colorant will occur during printing to be modified to compensate for over-saturation due to the dye-enriched colorant. Blocks 550 and 510, in particular sub-block 540, may be cooperate iteratively as a modification of the image data for example by decreasing the saturation of a particular image region will change for example the associated contone value which may change the number of pixels in which dye-enriched colorant will be printed.

The modified image data of block 550 may also be converted to a different data format, for example image files with different color models or any other data format that enables storage of data relating to images.

Figure 9:
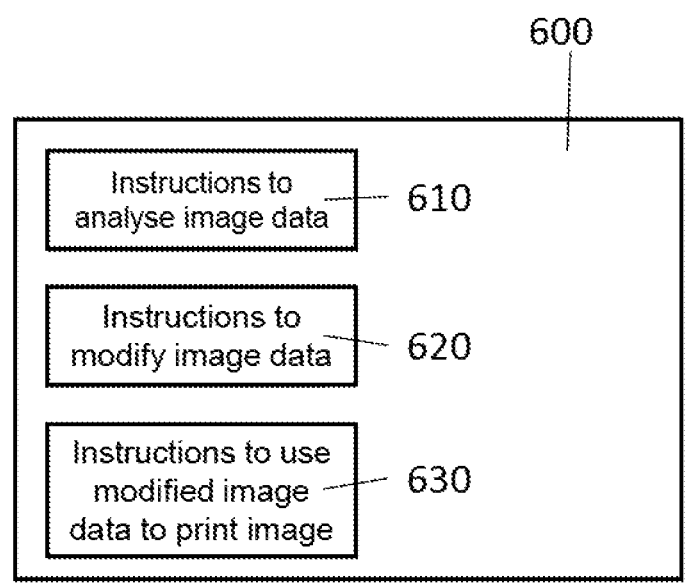
FIG. 9 is an example of a non-transitory machine-readable storage medium.

FIG. 9 shows an example of a non-transitory machine-readable storage medium 600 encoded with instructions executable by a processor. The instructions include instructions 610 to analyse image data of an image to be printed, the image data including data of each colorant to be printed, to identify an image region which is associated with a predicted over-saturation quality defect during printing, wherein the predicted over-saturation is associated with dye-enrichment.

The instructions of the example machine-readable storage medium 600 is further encoded with instructions 620 to modify the image data to compensate for the predicted over-saturation; and instructions 630 to use the modified image data to print the image.

The instructions 610, 620 and 630 may be executed by a processor in order to perform the first or second example methods of FIGS. 7 and 8. A processor executing the instructions 610 may perform the functions of the image analysing module 320. A processor executing the instructions 610 may perform the functions of the image modifying module 330. A processor executing the instructions 630 may perform the functions of the printer 340. A particular processor may also execute any combination of the instructions 610, 620 and 630.

The instructions 610 to analyse image data may include instructions to determine at least one of the following parameters: idle time of each nozzle of the printhead, type of colorant, contone values of the different image regions, masking, resolution, print speed, number of passes, firing frequency of each nozzle, temperature and humidity in a print chamber, and a trickle warming temperature. Further included may be instructions to identify the image region associated with a predicted over-saturation quality defect based on any combination of the determined parameters.

The parameters idle time of each nozzle of the printhead, contone values of the different image regions, and resolution of the image 190 to be printed, may be determined based on the image data of the image to be printed.

The parameters type of colorant, masking, resolution of the printhead 110, print speed, number of passes, firing frequency of each nozzle, temperature and humidity in a print chamber, and trickle warming temperature may each either be determined automatically based on available information in the thermal inkjet printer 100, for example based on sensors or printing settings or may be set by a user. Some parameters may be constant settings for certain printing applications or particular printers.

Particularly for examples in which all parameters are either determined based on the image data of the image to be printed, are set by a user or are constant, it is easily possible to perform the functions of the image analysing module 320 and the image modifying module 330, blocks 400, 410 and 420 of the first example method, blocks 500, 510 and 550 of the second example method or the instructions 610 and 620 independently of the performance of the printer 340, and the printing based on blocks 430 and 560 of the example methods or instructions 630.

The instructions 620 to analyse the image data may further include instructions to calculate a dye-enrichment concentration of each nozzle and the instructions 630 to modify the image data may include instructions to modify the image data to compensate for dye-enrichment in the identified image region based on the calculated dye-enrichment concentration of each nozzle. Further details regarding the calculation of the dye-enrichment concentration of each nozzle have been described with regard to sub-block 530 of the second example method of FIG. 8.

The instructions 620 to analyse image data may further include instructions to calculate a number of pixels in which dye-enriched colorant will be printed and the instructions 630 to modify the image data may include instructions to modify the image data to compensate for dye-enrichment in the identified image region based on the number of pixels in which dye-enriched colorant will be printed. Further details regarding the calculation of the number of pixels in which dye-enriched colorant will be printed have been described with regard to sub-block 540 of the second example method of FIG. 8.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    obtaining image data of an image to be printed, the image data specifying colorant to be output from nozzles of a printhead to print the image;
    analyzing the image data to detect areas of the image in which dye-enriched colorant will be output when printing the image as a result of colorant concentration at the nozzles of the printhead due to solvent evaporation at the nozzles;
    modifying the image data to compensate for over-saturation due to the dye-enriched colorant in the detected areas; and
    printing the image based on the modified image data, by causing the nozzles of the printhead to output the colorant specified by the modified image data.

2. A method in accordance with the method of claim 1, wherein
    the analysis of the image data is based on at least one of: idle time of the nozzles of the printhead, the type of the colorant, and contone values of different image areas.

3. A method in accordance with the method of claim 1, wherein
    the analysis of the image data is further based on at least one of: masking, resolution, print speed, number of passes, firing frequency of each nozzle, temperature and humidity in a print chamber, and a trickle warming temperature.

4. A method in accordance with the method of claim 1, wherein
    the analysis of the image data includes calculating a dye-enrichment concentration of each nozzle of the printhead.

5. A method in accordance with the method of claim 1, wherein
    the analysis of the image data includes calculating a number of pixels in which the dye-enriched colorant will be printed by each nozzle.

6. A thermal inkjet printer comprising:
    a printhead comprising a plurality of nozzles;
    a processor; and
    a memory storing instructions executable by the processor to:
        analyze image data of an image to be printed, the image data specifying colorant to be output from the nozzles of the printhead to print the image;
        identify the nozzles from which dye-enriched colorant will be output when printing the image as a result of colorant concentration at the nozzles due to solvent evaporation at the nozzles;
        modify the image data to compensate dye-enrichment in the identified nozzles from which the dye-enriched will be output when printing the image; and
    a printer for printing the image based on the modified image data.

7. A thermal inkjet printer in accordance with the thermal inkjet printer of claim 6, wherein the instructions are executable by the processor to
    determine at least one of the following parameters: idle time of each nozzle of the printhead, a type of the colorant, and e contone values of different image areas; and to
    identify the nozzles from which the dye-enriched colorant will be output when printing the image, based on the determined parameters.

8. A thermal inkjet printer in accordance with the thermal inkjet printer of claim 6, wherein the instructions are executable by the processor to
    determine at least one of the following parameters: masking, resolution, print speed, number of passes, firing frequency of each nozzle, temperature and humidity in a print chamber, and a trickle warming temperature; and to
    identify the nozzles from which the dye-enriched colorant will be output when printing the image, based on the determined parameters.

9. A thermal inkjet printer in accordance with the thermal inkjet printer of claim 6, wherein the instructions are executable by the processor to
    calculate a dye-enrichment concentration of each nozzle; and
    modify the image data to compensate the dye-enrichment in the identified nozzles based on the calculated dye-enrichment concentration of each nozzle.

10. A thermal inkjet printer in accordance with the thermal inkjet printer of claim 6, wherein the instructions are executable by the processor to
    calculate a number of pixels in which dye-enriched colorant will be printed; and
    modify the image data to compensate for over-saturation based on the number of pixels in which the dye-enriched colorant will be printed.

11. A non-transitory machine-readable storage medium encoded with instructions executable by a processor to perform processing comprising:
    analyzing image data of an image to be printed, the image data specifying colorant to be output from nozzles of a printhead to print the image;
    identifying an image region in which dye-enriched colorant will be output when printing the image as a result of colorant concentration at the nozzles of the printhead due to solvent evaporation at the nozzles;
    modifying the image data to compensate for over-saturation due to the dye-enriched colorant in the identified image region; and
    using the modified image data to print the image.

12. A machine-readable storage medium in accordance with the machine-readable storage medium of claim 11, wherein the processing further comprises determining at least one of the following parameters: idle time of each nozzle of the printhead, a type of the colorant, and contone values of different image regions; and identifying the image region in which the dye-enriched colorant will be output when printing the image, based on the determined parameters.

13. A machine-readable storage medium in accordance with the machine-readable storage medium of claim 11, wherein the processing further comprises determining at least one of the following parameters: masking, resolution, print speed, number of passes, firing frequency of each nozzle, temperature and humidity in a print chamber, and a trickle warming temperature; and identifying the image region in which the dye-enriched colorant will be output when printing the image, based on the determined parameters.

14. A machine-readable storage medium in accordance with the machine-readable storage medium of claim 11, wherein the processing further comprises calculating a dye-enrichment concentration of each nozzle; and modifying the image data to compensate for dye-enrichment in the identified image region based on the calculated dye-enrichment concentration of each nozzle.

15. A machine-readable storage medium in accordance with the machine-readable storage medium of claim 11, wherein the processing further comprises calculating a number of pixels in which the dye-enriched colorant will be printed; and modifying the image data to compensate for dye-enrichment in the identified image region based on the number of pixels in which the dye-enriched colorant will be printed.

\* \* \* \* \*